US012442935B2

(12) United States Patent
Faraco et al.

(10) Patent No.: US 12,442,935 B2
(45) Date of Patent: Oct. 14, 2025

(54) SYSTEM CONFIGURED TO SELECT A PORTION OF A VIRTUAL SCENARIO DURING THE MOVEMENT OF A VEHICLE WITHIN A GEOGRAPHICAL AREA OF INTEREST

(71) Applicant: INVISIBLE CITIES S.R.L., Ferentino (IT)

(72) Inventors: Guido Ernesto Faraco, Ferentino (IT); Giorgio Capaci, Ferentino (IT); Augusto Alfonso Maria Angeletti Latini, Ferentino (IT); Lorenzo Raffi, Ferentino (IT)

(73) Assignee: INVISIBLE CITIES S.R.L., Ferentino (IT)

( * ) Notice: Subject to any disclaimer, the term of this patent is extended or adjusted under 35 U.S.C. 154(b) by 482 days.

(21) Appl. No.: 17/907,316

(22) PCT Filed: Mar. 26, 2021

(86) PCT No.: PCT/IT2021/050086
§ 371 (c)(1),
(2) Date: Sep. 26, 2022

(87) PCT Pub. No.: WO2021/191936
PCT Pub. Date: Sep. 30, 2021

(65) Prior Publication Data
US 2023/0116134 A1 Apr. 13, 2023

(30) Foreign Application Priority Data
Mar. 27, 2020 (IT) .......................... 102020000006472

(51) Int. Cl.
*G01S 19/47* (2010.01)
*G01C 21/16* (2006.01)
(52) U.S. Cl.
CPC ............ *G01S 19/47* (2013.01); *G01C 21/183* (2020.08)
(58) Field of Classification Search
CPC ..... G01S 19/47; G01C 21/183; G01C 21/365; G01C 21/3679; G02B 30/00; H04N 21/41422; H04N 21/4524
See application file for complete search history.

(56) References Cited

U.S. PATENT DOCUMENTS

| 8,968,099 B1* | 3/2015 | Hanke | A63F 13/216 463/9 |
| 2013/0083011 A1* | 4/2013 | Geisner | G06F 3/013 345/419 |

(Continued)

FOREIGN PATENT DOCUMENTS

WO WO-2013085639 A1 * 6/2013 ............. A63F 13/12

OTHER PUBLICATIONS

Q. Fu, Q. Zhou, G. Yan, S. Li and F. Wu, "Unified All-Earth Navigation Mechanization and Virtual Polar Region Technology," in IEEE Transactions on Instrumentation and Measurement, vol. 70, pp. 1-11, 2021, Art No. 8501211 (Year: 2021).*

(Continued)

*Primary Examiner* — Catherine T. Rastovski
(74) *Attorney, Agent, or Firm* — Knobbe, Martens, Olson & Bear, LLP

(57) ABSTRACT

The present invention relates to a system (1) configured to select a portion of a virtual scenario (S1v,S2v) during the movement of a vehicle (V) within a geographical area of interest (A). Said system (1) is capable of obtaining information associated with the vehicle (V) regarding the position, the rotation with respect to the x, y, z axes of a reference system associated with the vehicle itself, as well as the heading, and applying this information to a virtual geographical area (Av) associated with said geographical area of interest (A), so that each movement of the vehicle (V) in the geographical area of interest (A) corresponds to a respective movement in the virtual geographical area (Av). In this way, the viewing of a virtual scenario (S1V, S2V) changes according to the movement of the vehicle. The present invention relates also to a vehicle (V) comprising said system, as well as to a method for selecting a portion of a virtual scenario during the movement of a vehicle (V) within a geographical area of interest (A) by means of said system.

18 Claims, 4 Drawing Sheets

(56) References Cited

U.S. PATENT DOCUMENTS

| | | |
|---|---|---|
| 2018/0254001 A1 | 9/2018 | Koren |
| 2019/0139321 A1 | 5/2019 | Kocharlakota et al. |
| 2020/0082621 A1 | 3/2020 | Son et al. |

OTHER PUBLICATIONS

J. Grubert, T. Langlotz, S. Zollmann and H. Regenbrecht, "Towards Pervasive Augmented Reality: Context-Awareness in Augmented Reality," in IEEE Transactions on Visualization and Computer Graphics, vol. 23, No. 6, pp. 1706-1724, Jun. 1, 2017 (Year: 2017).*
T. Pereira, O. Pereira, P. Fazendeiro and A. Gomes, "A gyro-enhanced smart-phone framework to develop motion-based user interfaces for animation and virtual environments," 2016 23rd Portuguese Meeting on Computer Graphics and Interaction (EPCGI), Covilha, Portugal, 2016, pp. 1-7 (Year: 2016).*
International Search Report and Written Opinion received in PCT/IT2021/050086, dated Jul. 2, 2021.
Search Report and Written Opinion received in IT202000006472, dated Dec. 12, 2020.

\* cited by examiner

SYSTEM CONFIGURED TO SELECT A PORTION OF A VIRTUAL SCENARIO DURING THE MOVEMENT OF A VEHICLE WITHIN A GEOGRAPHICAL AREA OF INTEREST

The present invention relates to a system configured to select a portion of a virtual scenario during the movement of a vehicle within a geographical area of interest.

In particular, the invention relates to the structure of a system designed to provide a user traveling on said vehicle within a geographical area of interest, which is a real geographical area, a dynamic and immersive viewing of a virtual scenario, preferably associated with the real scenario surrounding the vehicle.

More specifically, the system is designed in such a way that each movement of the vehicle in said geographical area of interest (due to the fact that the path within said geographical area of interest changes and/or the direction of movement of the vehicle within said path changes) corresponds to a movement in a virtual geographical area associated with said geographical area of interest and that the observation point of the virtual scenario of the user changes according to the movement of said vehicle in said geographical area of interest.

Even more particularly, when the vehicle moves within a geographical area of interest, depending on its path and/or its direction of movement, the system allows to select a portion of said virtual scenario based on the movement of said vehicle, so that a user sees a virtual scenario as if said user were on a virtual vehicle that moves within the virtual geographical area in the same way that the vehicle moves within the geographical area of interest.

In other words, the movement of the vehicle is "transferred" from a real geographical area to a virtual environment and the users observation point on the vehicle is "transferred" from a real environment to a virtual environment, so that the user observes the virtual environment from the same observation point with which observes the real environment.

For example, if the vehicle moves within a path (which in turn is within a geographical area of interest) on a road in a direction defined by a straight line, the user will see a virtual scenario around the path of the vehicle moving along said straight line.

In a further example, if the vehicle moves within a path (which in turn is within a geographical area of interest) on a road in a direction defined by a zigzag line, the user will see a virtual scenario around the path of the vehicle moving along said zigzag line.

In other words, the observation point of the user who sees a virtual scenario always "follows" the observation point with which the user sees the real scenario around the path of the vehicle (which moves within the geographical area of interest), even when the direction of movement of said vehicle changes within said path.

In particular, the variations of the virtual scenario based on the movement of the vehicle will allow a fluid view of this virtual scenario, in order to make the immersive experience as realistic as possible.

For this reason, it is possible to say that the system is able to synchronize the observation point with which the user observes the real scenario surrounding the vehicle with the observation point with which the user observes the virtual scenario, so that, when the observation point with which the user observes the real scenario around the vehicle changes (based on the path and/or the direction of the vehicle within said path) also the observation point with which the user observes the virtual scenario changes.

PRIOR ART

Currently, different systems are known which allow a user to view a virtual scenario when said user is on a moving vehicle.

A first example of a known type system is the use of a headset, such as the headset worn by a user in an amusement park when the user gets on a train for a roller coaster in an amusement park.

However, a disadvantage of this known type system is given by the fact that, through the headset, a user can only see the virtual scenario that has been associated with a real scenario in which the path taken by the train within said real scenario it is known a priori as it is defined by the tracks on which said train moves, without the possibility that further virtual scenarios are associated with further paths, different from the train path.

A second example of a known type of system is constituted by a vehicle for the exclusive transport of people in which each person wears a respective headset.

However, a disadvantage of this known type system is that the virtual scenario seen by each person through the headset is not associated from time to time with the real scenario around the vehicle.

Aim of the Invention

The aim of the present invention is to overcome said disadvantages, providing a system configured to select a portion of a virtual scenario during the movement of a vehicle within a geographical area of interest, so that, when the observation point of a user on the vehicle with respect to a real scenario changes (due to the path of the vehicle within said geographical area of interest and/or to the direction of movement of the vehicle within said path), the portion of said virtual scenario is such as to be view with the same observation point as the user placed on the vehicle.

In this way, a user on a vehicle sees a dynamic virtual scenario and the viewing of said virtual scenario depends on the position, orientation and rotation of the vehicle moving in said geographical area of interest.

Therefore, a user will see a virtual scenario with an observation point that is different from time to time based on the path and/or direction of movement of the vehicle within said path.

In fact, if the path of the vehicle changes within said geographical area of interest and/or the direction of movement of the vehicle changes within said path, the observation point of a user on the vehicle changes and consequently the observation point with which the user sees the virtual scenario changes.

Changing the users observation point based on the real movements of the vehicle advantageously allows to reduce or totally eliminate the side effects that can occur in immersive environments, such as nausea, dizziness and/or possible fainting.

OBJECT OF THE INVENTION

It is therefore object of the invention a system configured to select a portion of a virtual scenario during the movement of a vehicle within a geographical area of interest, wherein said virtual scenario comprises a 3D graphic content or a 3D graphic content in combination with an audio content, wherein said system comprises:

at least one inertial measurement unit, to be install on said vehicle, comprising:

an accelerometer to acquire in each time instant t a respective triad of values associated with linear accelerations $A_X, A_Y, A_Z$ along the x, y, z axes, magnetometer to measure at each time instant t the values of a respective vector $m=[m_x, m_y, m_z]$ associated with the terrestrial magnetic field strength along the x,y,z axes, at least one geolocation device, to be install on said vehicle, to obtain at each time instant t the geographical coordinates $LAT_V$, $LONG_V$ in terms of latitude and longitude values associated with said vehicle, storage means in which the following data are stored:

a geographical area of interest, where each point of said geographical area of interest is associated with a value of latitude value and a value of longitude, and a Cartesian plane $x_A, y_A$ is associated with said geographical area of interest, so that each point of said geographical area of interest corresponds to a respective point on said Cartesian plane $x_A, y_A$, the position of a first point identified by first Cartesian coordinates $x_{P1}^{x_A}$, $y_{P1}^{y_A}$ with respect to said Cartesian plane $x_A, y_A$ and first values of latitude and longitude $LAT_{P1}, LONG_{P1}$ with respect to said geographical area of interest, the position of a second point, different from said first point, identified by second Cartesian coordinates $x_{P2}^{x_A}$, $y_{P2}^{y_A}$ with respect to said Cartesian plane $x_A, y_A$ and second values of latitude and longitude $LAT_{P2}$, $LONG_{P2}$ with respect to said geographical area of interest, a virtual geographical area associated with said geographical area of interest, at least one virtual scenario, wherein said virtual scenario is a function of a plurality of parameters referred to said vehicle: position of said vehicle in said geographical area of interest, a pitch angle θ, a roll angle γ and a heading φ, a first difference value $LAT_{DIF}$ and a second difference value $LONG_{DIF}$ expressed respectively in terms of latitude and longitude, as well as a third difference value $X_{DIF}$ and a fourth difference value $Y_{DIF}$ expressed respectively in terms of Cartesian coordinates with respect to the Cartesian plane $x_A, y_A$:

$$LAT_{DIF} = LAT_{P1} - LAT_{P2}$$

$$LONG_{DIF} = LONG_{P1} - LONG_{P2}$$

$$X_{DIF} = x_{P1}^{x_A} - x_{P2}^{x_A}$$

$$Y_{DIF} = y_{P1}^{y_A} - y_{P2}^{y_A}$$

Furthermore, said system comprises a logic control unit being connected to said inertial measurement unit, to said geolocation device, as well as to said storage means, and configured to:

acquire at each time instant t from said inertial measurement unit, the values of each triad of linear accelerations $A_X, A_Y, A_Z$, as well as the values of each vector $m=[m_x, m_y, m_z]$ associated with the terrestrial magnetic field strength, calculate a pitch angle θ and a roll angle γ associated with said vehicle on the basis of said values associated with the linear accelerations $A_X, A_Y, A_Z$, as well as a heading φ, expressed in terms of angle, on the basis of horizontal components of said terrestrial magnetic field strength, acquire at each time instant t from said geolocation device the geographical coordinates $LONG_V, LAT_V$ associated with said vehicle, calculate the Cartesian coordinates identifying the position of said vehicle with respect to the Cartesian plane $x_A, y_A$ by means of the following formulas:

$$P_{Vx}^{x_A} = \frac{(LONG_V - LONG_{P2}) \times X_{DIF}}{LONG_{DIF}} + x_{P2}^{x_A}$$

$$P_{Vy}^{y_A} = \frac{(LAT_V - LAT_{P2}) \times Y_{DIF}}{LAT_{DIF}} + y_{P2}^{y_A}$$

apply said Cartesian coordinates $P_{Vx}^{x_A}, P_{Vy}^{y_A}$ and the information associated with said pitch angle θ, said roll angle γ and said heading φ to said virtual geographical area, to determine how said vehicle moves with respect to said virtual geographical area, so that at each movement of said vehicle in said geographical area of interest corresponds to a movement in said virtual geographical area, and select a portion of said virtual scenario stored in said storage means, on the basis of said Cartesian coordinates $P_{Vx}^{x_A}, P_{Vy}^{y_A}$ and said information associated with said pitch angle θ, said roll angle γ and said heading φ.

Advantageously, said logic control unit can be configured to generate a frame associated with said selected portion by means of a 3D rendering engine.

Further embodiments of the system are disclosed in the dependent claims.

The present invention relates also to a vehicle V comprising a system above mentioned and at least one display device to display said virtual scenario.

Further embodiments of the vehicle are disclosed in the dependent claims.

Furthermore, the present invention also relates to a method for selecting a portion of a virtual scenario during the movement of a vehicle (V) within a geographical area of interest (A), by means of the system above mentioned, comprising the following steps:

A) acquiring at each time instant t the values of each triad of linear accelerations $A_X, A_Y, A_Z$, as well as the values of each vector $m=[m_x, m_y, m_z]$ associated with the terrestrial magnetic field strength, B) calculating a pitch angle θ and a roll angle γ associated with said vehicle on the basis of said values associated to the linear accelerations $A_X, A_Y, A_Z$, as well as a heading φ, expressed in terms of angle, on the basis of horizontal components of said terrestrial magnetic field strength, C) acquiring at each time instant t the geographical coordinates $LAT_V, LONG_V$ associated with said vehicle, D) calculating the Cartesian coordinates identifying the position of said vehicle with respect to the Cartesian plane $x_A, y_A$ by means of the following formulas:

$$P_{Vx}^{x_A} = \frac{(LONG_V - LONG_{P2}) \times X_{DIF}}{LONG_{DIF}} + x_{P2}^{x_A}$$

-continued
$$P_{Vy}^{y_A} = \frac{(LAT_V - LAT_{P2}) \times Y_{DIF}}{LAT_{DIF}} + y_{P2}^{y_A}$$

E) applying said Cartesian coordinates $P_{Vx}^{x_A}, P_{Vy}^{y_A}$ and the information associated with said pitch angle θ, said roll angle γ and said heading ϕ to said virtual geographical area, to determine how said vehicle (V) moves with respect to said virtual geographical area ($A_V$), so that each movement of said vehicle in said geographical area of interest corresponds to a movement in said virtual geographical area, and F) selecting a portion of said virtual scenario stored in said storage means, on the basis of said Cartesian coordinates $P_{Vx}^{x_A}, P_{Vy}^{y_A}$ and said information associated with said pitch angle θ, said roll angle γ and said heading ϕ.

Advantageously, said method can comprise the step of generating a frame associated to a selected portion by means of a 3D rendering engine.

Further embodiments of the method are disclosed in the dependent claims.

ATTACHED FIGURE LIST

The present invention will be now described, for illustrative, but not limitative purposes, according to its embodiment, making particular reference to the enclosed figures, wherein.

Figure 7A:
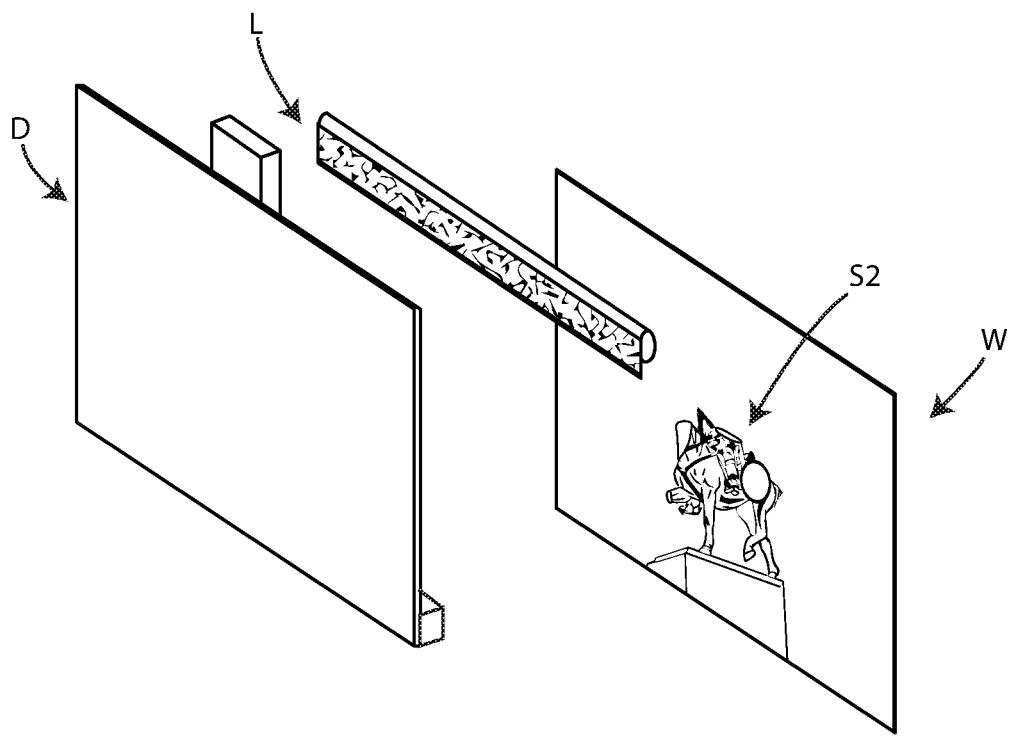
Figure 7B:
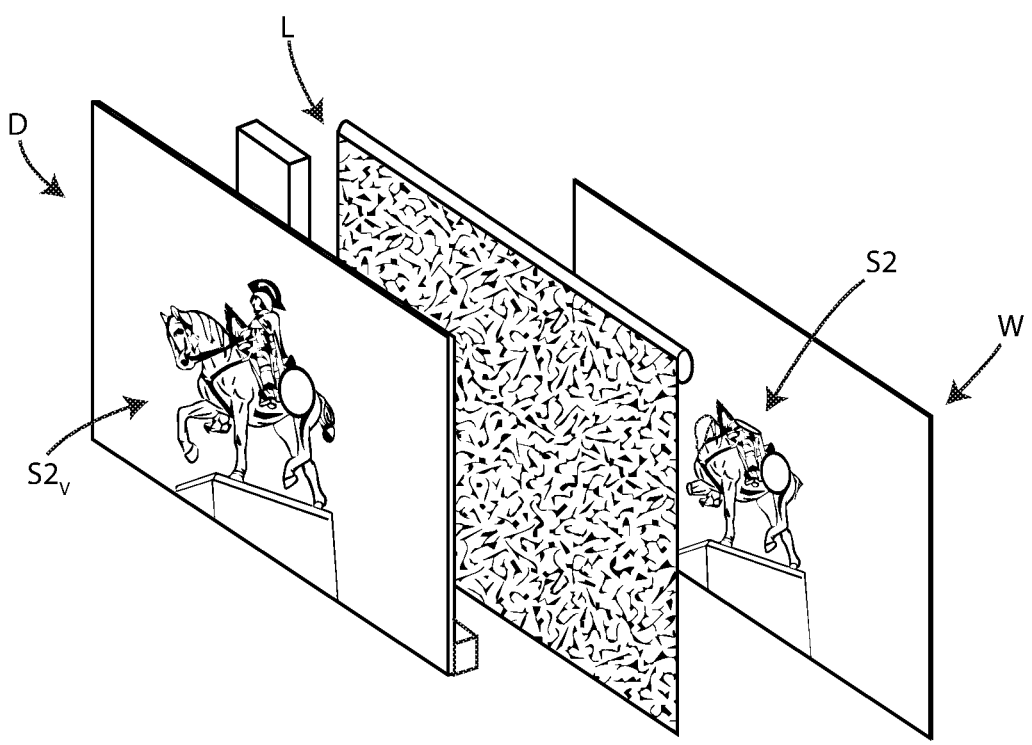

FIGS. 7A and 7B are a respective exploded view to show in detail a window, a display device in correspondence with said window and filtering means for filtering a light radiation coming from the outside of the vehicle, arranged between said window and said device display, in which said filtering means comprise a blackout curtain, and said blackout curtain is respectively raised and lowered with respect to the window.

DETAILED DESCRIPTION OF THE INVENTION

With reference to Figures, a system 1 configured to select a portion of a virtual scenario during the movement of a vehicle V within a geographical area of interest A.

In the embodiment being disclosed, said virtual scenario is associated to a real scenario in said geographical area of interest.

In other words, in the embodiment being disclosed, the virtual scenario is a 3D modelling of the real scenario surrounding the vehicle.

However, said virtual scenario can be a 3D modelling of any "environment" which is not connected to the real scenario surrounding the vehicle V.

The geographical area of interest A is established before the system is used.

Consequently, the real scenario contained in said geographical area of interest is known: routes, square, monuments, churches, fountains, obelisk, etc.

Thus, the routes, the squares, the monuments, the churches, the fountains, the obelisk, etc. present in said geographical area of interest are the elements that constitute or are included in said real scenario.

The virtual scenario is a 3D modelling of the real scenario and can comprise each element being part of said real scenario.

More particularly, said virtual scenario can comprise or consist of a 3D graphic content or a 3D graphic content associated to each element being part of the real scenario.

Furthermore, such 3D modelling can be in combination with an audio content.

Said system 1 is installable on said vehicle V and a reference system x,y,z is associated with said vehicle V.

In the example being disclosed, the x axis and the y axis define the plane on which said vehicle V moves.

Furthermore, in the example being disclosed, said vehicle V is a minibus.

Figure 1:
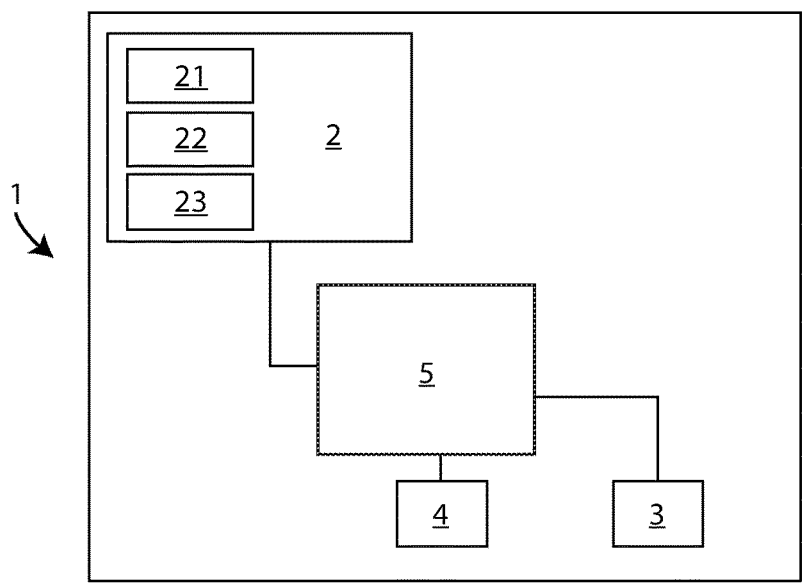
FIG. 1 is a schematic view of the system object of the invention, to be applied to a vehicle.

As shown in FIG. 1, said system 1 comprises:

at least one inertial measurement unit 2 comprising:
- an accelerometer 22 to acquire in each time instant t a respective triad of values associated with linear accelerations $A_X, A_Y, A_Z$ along the x, y, z axes,
- a magnetometer 23 to measure at each time instant t the values of a respective vector $m=[m_x, m_y, m_z]$ associated with the terrestrial magnetic field strength along the x,y,z axes, at least one geolocation device 3 to obtain at each time instant t the geographical coordinates $LAT_V, LONG_V$ associated with said vehicle V, expressed in terms of latitude and longitude values (with respect to the terrestrial reference system)

storage means 4 in which the following data are stored:
- a geographical area of interest A, where each point of said geographical area of interest A is associated with a value of latitude and a value of longitude,
- a Cartesian plane $x_A, y_A$ is associated with said geographical area of interest A, so that each point of said geographical area of interest A corresponds to a respective point on said Cartesian plane $x_A, y_A$ the position of which is identified by Cartesian coordinates,
- the position of a first point P1 identified by first Cartesian coordinates $x_{P1}^{x_A}, y_{P1}^{y_A}$ with respect to said Cartesian plane $x_A, y_A$ and first values of latitude and longitude $LAT_{P1}, LONG_{P1}$ with respect to said geographical area of interest A,
- the position of a second point P2, different from said first point P1, identified by second Cartesian coordinates $x_{P2}^{x_A}, y_{P2}^{y_A}$ with respect to said Cartesian plane $x_A, y_A$ and second values of latitude and longitude $LAT_{P2}, LONG_{P2}$ with respect to said geographical area of interest A, a virtual geographical area $A_V$ associated with said geographical area of interest A, at least one virtual scenario, wherein said virtual scenario is a function of a plurality of parameters referred to said vehicle V: position of said vehicle V in said geographical area of interest A, a pitch angle θ, a roll angle γ and a heading φ, a first difference value $LAT_{DIF}$ and a second difference value $LONG_{DIF}$ expressed respectively in terms of latitude and longitude, as well as a third difference value $X_{DIF}$ and a fourth difference value $Y_{DIF}$ expressed respectively in terms of Cartesian coordinates with respect to the Cartesian plane $x_A, y_A$:

$LAT_{DIF} = LAT_{P1} - LAT_{P2}$ $LONG_{DIF} = LONG_{P1} - LONG_{P2}$ $X_{DIF} = x_{P1}^{x_A} - x_{P2}^{x_A}$ $Y_{DIF} = y_{P1}^{y_A} - y_{P2}^{y_A}$.

Regarding to the values associated with the linear accelerations $A_X, A_Y, A_Z$ along the x,y,z axes and to the vector $m=[m_x, m_y, m_z]$ associated with the terrestrial magnetic field strength along the x,y,z axes, the values of said linear accelerations and the values of said terrestrial magnetic field strength are measured with respect to the reference system x,y,z associated with the vehicle V on which the system is installed.

As will be explained in detail below, said geographical area of interest A has the shape of a quadrilateral, preferable the shape of a rectangle or a square, and said first point P1 and said second point P2 are arranged at a respective vertex of said rectangle or said square and said vertices are arranged along a diagonal of said rectangle or said square.

Furthermore, in the embodiment being disclosed, said geolocation device 3 is a GNSS receiver From a time point of view, said virtual geographical area $A_V$ and said virtual scenario have been stored a priori, i.e. before that the system is used.

In particular, said virtual geographical area $A_V$ and said virtual scenario have been created and modelled respectively on a geographical area of interest A (that can be travelled by the vehicle V) and a real scenario present within said geographical area of interest A, on the basis of one or more path that said vehicle V can travel within said geographical area of interest A and on the basis of the movement direction of said vehicle V within each of said paths.

The creation and modelling of a virtual geographical area takes into account that vehicle V can change its path within the geographical area of interest and/or that its movement direction can change (for example due to a pothole or if the vehicle accidentally gets on a sidewalk), so that a respective movement in the virtual geographical area can correspond to each possible movement of the vehicle in the geographical area of interest.

The creation and the modelling of a virtual geographical area $A_V$ and a virtual scenario are not object of the present patent application, but the technical solution object of such patent application is focused on the possibility to offer the user on a vehicle to observe a virtual scenario (preferable associated with a real scenario) with the same observation point with which observes the real scenario surrounding the vehicle moving within a geographical area of interest A, depending on the movement of said vehicle.

Figure 2:
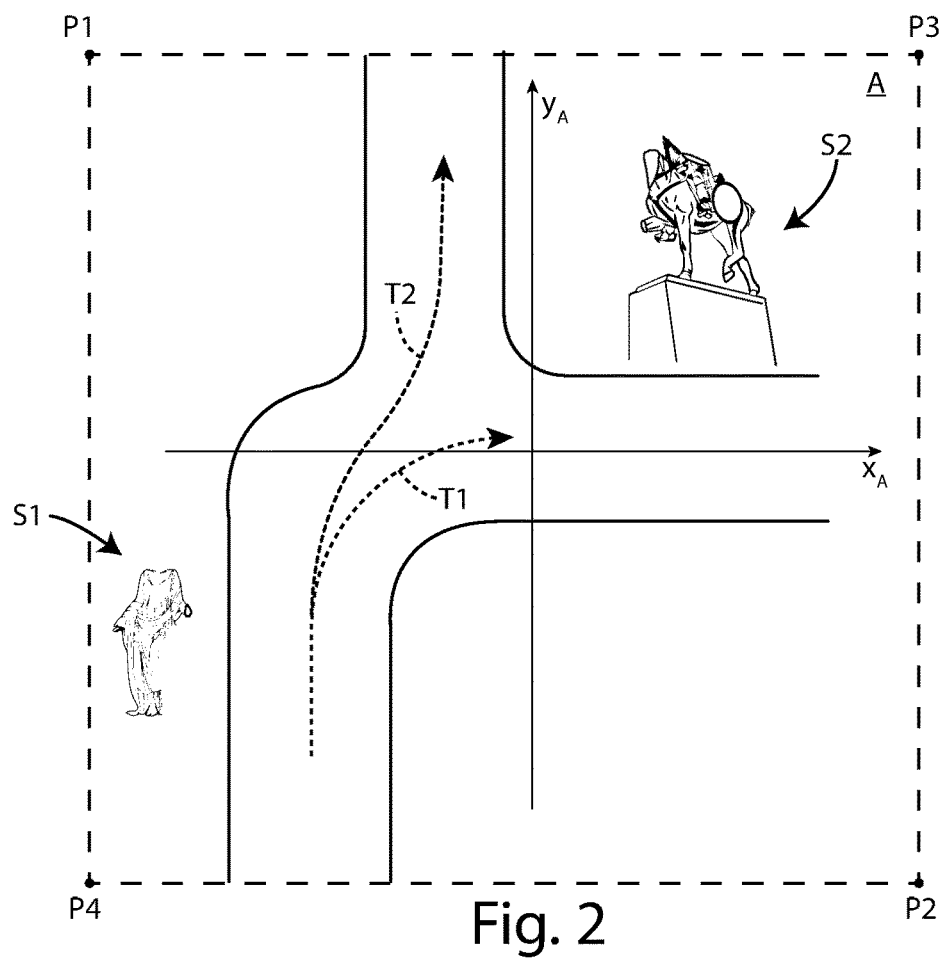
FIG. 2 is a schematic view showing a geographical area of interest, within which a vehicle provided with said system can move, and a real scenario present in said geographical area of interest which includes a first statue and a second statue, each of which is devoid of some parts.

FIG. 2 shows the geographical area of interest A within of which the vehicle V can move.

In the example being disclosed, said geographical area of interest A has a first path T1 and a second path T2, each of which is indicated by a respective dashed arrow.

The first path T1 is defined by a first trajectory in which the vehicle V turns right with respect to its movement direction.

The second path T2 is defined by a second trajectory in which the vehicle V go substantially ahead with respect to its movement direction.

The real scenario present in said geographical area of interest comprises a first statue S1 and a second statue s2, arranged along the first path T1.

Each of said statues S1,S2 is devoid of some parts.

Figure 3:
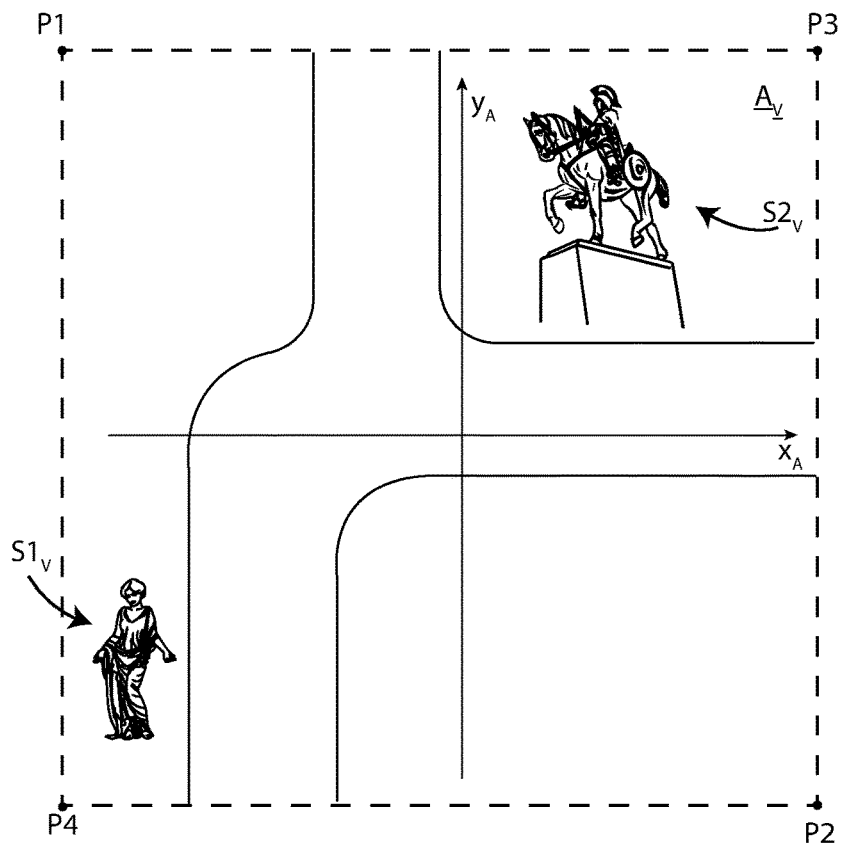
FIG. 3 is a schematic view showing a virtual geographical area associated with the geographical area of interest and a virtual scenario comprising a first virtual statue and a second virtual statue, each of which is the respective reproduction of the first statue and the second statue in the their entirety.

FIG. 3 shows the virtual geographical area $A_V$ associated with the geographical area of interest A.

In the example being disclosed, the virtual scenario is associated with the real scenario.

In other words, the virtual environment in which the vehicle is a 3D reproduction of the real environment in which the vehicle moves. However, as already said, the virtual environment can be any virtual environment, also a virtual fantasy environment, and then not necessarily connected to the real environment.

The virtual scenario (associated with the real scenario above mentioned) comprises a first virtual statue S1v and a second virtual statue S2v, each of which is respectively the reproduction of the first statue S1 and the second statue S2 in their entirety, so that a user can see the statues as they originally were, as the vehicle V passes in correspondence with said first statue S1 and said second statue S2

However, although not shown in Figures, the geographical area of interest A can have any size and any number of paths. Said geographical area of interest A can be a predetermined zone of a town or of a region, etc. The real scenario can comprise any monument or any building (for example a church, a museum, etc.) or more generally any element (for example a fountain, an obelisk).

As said above, the virtual scenario is any virtual content (that can be an example of a 3D graphic content with or without an audio content) that can be referred to said monument or to said building or to said element present in said geographical area of interest A, without departing from the scope of invention.

For example, said virtual content can be created to allow a user to imagine a precise historical period in which said monument or said building or said element assumed relevance, so as to given value to said monument or said building or said element.

Figure 4:
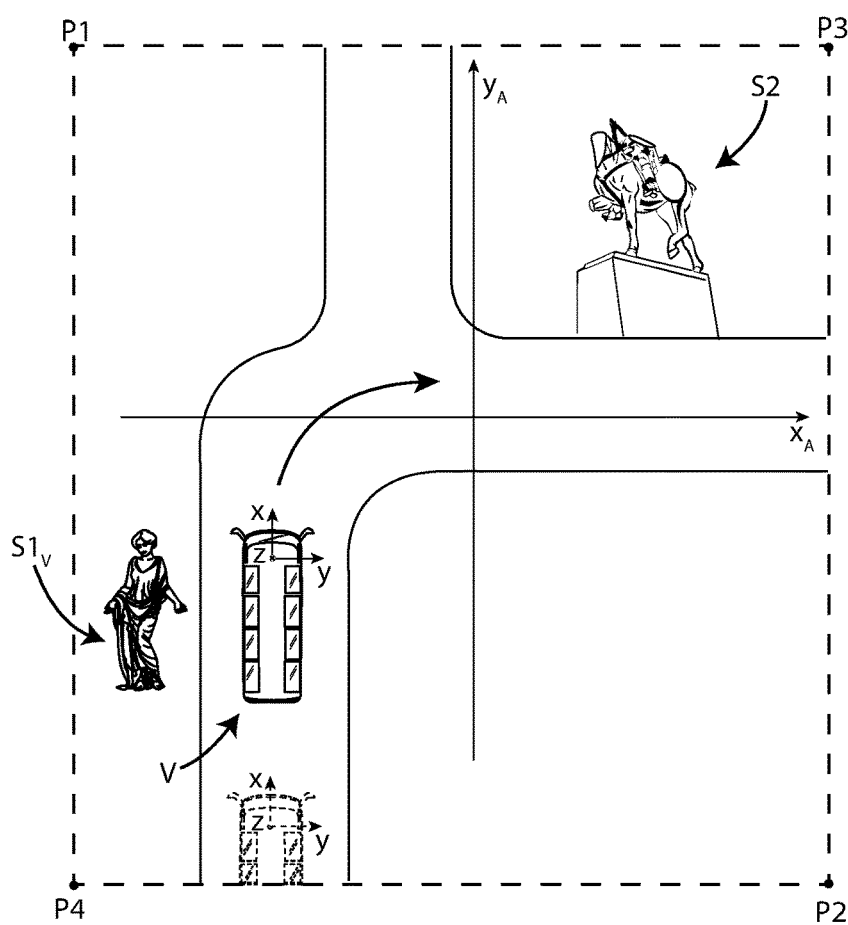
FIG. 4 is a schematic view showing the passage of the vehicle near the first statue which, by means of the system object of the invention, is virtually seen in its entirety.
Figure 5:
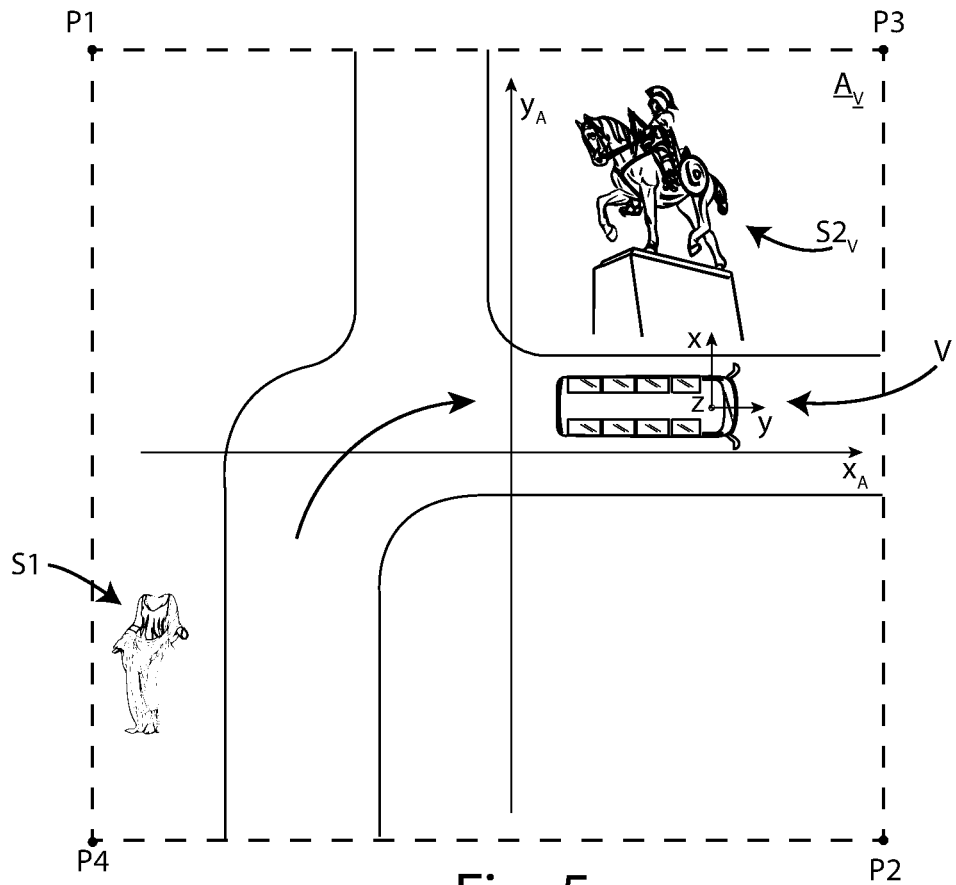
FIG. 5 is a schematic view showing the passage of the vehicle near the second statue which by means of the system object of the invention is virtually seen in its entirety.

In the example being described, the vehicle V travels along a first road (near which the first statue S1 is located) along a direction defined by a straight line, turns right and takes a second road (near which said second statue S2 is located), then following a direction defined by a further straight line (FIGS. 4 and 5).

Furthermore, returning to FIG. 1, said system 1 comprises a logic control unit 5 that is connected to said inertial measurement unit 2, to said geolocation device 3, as well as to said storage means 4, and is configured to:

acquire at each time instant t from said inertial measurement unit 2, the values of each triad of angular velocities $\omega_X, \omega_Y, \omega_Z$ along the x,y,z axes, the values of each triad of linear accelerations $A_X, A_Y, A_Z$, as well as the values of each vector $m=[m_x, m_y, m_z]$ associated with the terrestrial magnetic field strength, calculate a pitch angle θ and a roll angle γ associated with said vehicle V on the basis of said values associated with the linear accelerations $A_X, A_Y, A_Z$, as well as a heading φ, expressed in terms of angle, on the basis of horizontal components of said terrestrial magnetic field strength, acquire at each time instant t from said geolocation device 3 the geographical coordinates $LONG_V, LAT_V$ associated with said vehicle V, calculate the Cartesian coordinates identifying the position of said vehicle V with respect to the Cartesian plane $x_A, y_A$ by means of the following formulas:

$$P_{Vx}^{x_A} = \frac{(LONG_V - LONG_{P2}) \times X_{DIF}}{LONG_{DIF}} + x_{P2}^{x_A}$$

$$P_{Vy}^{y_A} = \frac{(LAT_V - LAT_{P2}) \times Y_{DIF}}{LAT_{DIF}} + y_{P2}^{y_A}$$

apply said Cartesian coordinates $P_{Vx}^{x_A}, P_{Vy}^{y_A}$ and the information associated with said pitch angle θ, said roll angle γ and said heading φ to said virtual geographical area $A_V$, to determine how said vehicle V moves with respect to said virtual geographical area $A_V$, so that at each movement of said vehicle V in said geographical area of interest A corresponds to a movement in said virtual geographical area $A_V$, select a portion of said virtual scenario stored in said storage means 4, on the basis of said Cartesian coordinates $P_{Vx}^{x_A}, P_{Vy}^{y_A}$ and said information associated with said pitch angle θ, said roll angle γ and said heading φ (in this way it is possible to guarantee the viewing of a virtual scenario which changes depending on the movement of the vehicle V on which a user is positioned).

In particular, said logic control unit 5 is configured to generate a graphic image or frame associated with the selected portion of said virtual scenario, by means of a 3D rendering engine.

Said graphic image or frame is generated in real time by said 3D rendering engine.

Said graphic image or frame is generated starting from said selected portion and will contain the information on the position of the vehicle (i.e. the Cartesian coordinates $P_{Vx}^{x_A}$, $P_{Vy}^{y_A}$), on the pitch angle θ, on the roll angle γ and the heading φ of the vehicle V Consequently, such graphic image or frame will be seen by the user on the vehicle with the same observation point with which the same user would observe the real scenario around the vehicle.

As already said, the geographical area of interest A is defined a priori, i.e. before that system is used, and is parameter that the logic control unit 5 receives as input together with said first point P1 and said second point P2.

Such geographical area of interest A has the shape of a quadrilateral, which can preferably be a rectangle or a square, and said first point P1 and said second point P2 have been chosen in such a way as to be at the vertices of said rectangle or square, and in particular along a diagonal of said rectangle or square.

The geographical area of interest A is also delimited by a third point P3 and a fourth point P4.

The third point P3 has the coordinate on the x axis of the Cartesian plane $x_A, y_A$ equal to the coordinate on the $x_A$ axis of the second point P2 and the coordinate on the $y_A$ axis of the Cartesian plane $x_A, y_A$ equal to the coordinate on the $y_A$ axis of the first point P1.

The fourth point P4 has the coordinate on the $x_A$ axis of the Cartesian plane $x_A, y_A$ equal to the coordinate on the $x_A$ axis of the first point P1 and the coordinate on the $y_A$ axis of the Cartesian plane $x_A, y_A$ equal to the coordinate on the $y_A$ axis of the second point P2.

However, the position of said third point P3 and the position of said fourth point P4 are not necessary for the purpose of calculating the Cartesian coordinates of the vehicle V with respect to the Cartesian plane $x_A, y_A$.

The fact that a Cartesian reference system, i.e. a Cartesian plane $x_A, y_A$, is associated to the geographical area of interest A allows each point of said geographical area of interest A to be identified not only by means of the latitude and longitude values with respect to said geographical area of interest but also by means of the Cartesian coordinate with respect to said Cartesian plane $x_A, y_A$.

Consequently, the position of the first point P1 is identified by means of the Cartesian coordinates $x_{P1}^{x_A}\ y_{P1}^{y_A}$ and of first values of latitude and longitude $LAT_{P1}, LONG_{P1}$ and the position of the second point P2 is identified by means of second Cartesian coordinates $x_{P2}^{x_A}\ y_{P2}^{y_A}$ and second values of latitude and longitude $LAT_{P2}, LONG_{P2}$.

Starting from the values of latitude and longitude and from the Cartesian coordinates of the first point P1 and the second point P2, the logic control unit 5 can calculate the values above mentioned: a first difference value $LAT_{DIF}$, a second difference value $LONG_{DIF}$, a third difference value $X_{DIF}$ and a fourth difference value $Y_{DIF}$.

Starting from the linear accelerations $A_X, A_Y, A_Z$ sent by the inertial measurement unit 2, the logic control unit 5 can calculate the pitch angle θ and the roll angle γ of the vehicle V. The pitch angle θ, the roll angle γ and heading φ can be calculated by means of the following formulas:

$$\theta = \arcsin\left(\frac{A_x}{g}\right)$$

where $A_x$ is the value of linear acceleration along the x axis, g is the acceleration of gravity, $$\gamma = \arctan\left(\frac{-A_Y}{A_Z}\right)$$

where $A_Y, A_Z$ are the values of linear accelerations respectively along the y axis and the z axis, $$\phi = \arctan\left(\frac{m_z^l}{m_x^l}\right) + D_m$$

where $m_x^l, m_z^l$, are the horizontal components of said terrestrial magnetic field strength respectively along the x axis and the z axis, $D_m$ is the magnetic declination.

With reference to the heading φ, the logic control unit 5 can calculate a vector $m^l = [m_x^l, m_y^l, m_z^l]$ associated with the horizontal component of the of the terrestrial magnetic field strength (defined by the horizontal components of the of said terrestrial magnetic field strength along the x,y,z axes) starting from the vector m associated with the terrestrial magnetic field strength, i.e. by the values of terrestrial magnetic field strength along the x,y,z axes.

The vector $m^l=[m_x^l, m_y^l, m_z^l]$ associated with said horizontal component can be calculated by means the following formula:

$$\begin{bmatrix} m_x^l \\ m_y^l \\ m_z^l \end{bmatrix} = \begin{bmatrix} \cos\theta & \sin\theta & 0 \\ -\cos\gamma\sin\theta & \cos\gamma\cos\theta & \sin\gamma \\ \sin\theta\sin\gamma & -\sin\gamma\cos\theta & \cos\gamma \end{bmatrix} \begin{bmatrix} m_x \\ m_y \\ m_z \end{bmatrix}$$

The logic control unit 5 can calculate the heading $\phi$ of the vehicle V by the values of the horizontal component $m_x^l$ along the x axis and the horizontal component mi, along the z axis (obtained by means of the formula mentioned above).

The term "heading" means the direction of movement of the vehicle V.

It is preferable that the logic control unit 5, after receiving the values of the geographical coordinates $LAT_V$,$LONG_V$ of the vehicle V (expressed in terms of values of latitude and longitude and sent by the geolocation device) is configured to:
- verify whether the geographical coordinates $LAT_V$, $LONG_V$ are contained in said geographical area of interest (A),
- calculate the Cartesian coordinates with respect to the Cartesian plane $x_A,y_A$ only if the geographical coordinates $LAT_V$,$LONG_V$ are contained in the geographical area of interest A.

If the vehicle V is within the geographical area of interest A, the logic control unit 5 calculates the Cartesian coordinates of the vehicle V with respect to the Cartesian plane $x_A,y_A$ otherwise if the vehicle V is not within the geographical area of interest A, the logic control unit 5 can be configured to send a message to indicate that the vehicle V is not within the geographical area of interest and no virtual scenario is displayed.

The Cartesian coordinates $P_{V_x}^{x_A}, P_{V_y}^{y_A}$ and the information associated with the pitch angle $\theta$, the roll angle $\gamma$ and the heading $\phi$ (expressed in terms of angle) are applied to the virtual geographical area $A_V$ in order to a respective movement in the virtual geographical area $A_V$ is associated with each movement of the vehicle V in the geographical area of interest A.

The term "apply" means to use the Cartesian coordinates and the information associated to the angles above mentioned in the virtual geographical area $A_V$ to follow the movements of the vehicle V within the virtual geographical area itself.

In other words, said Cartesian coordinates and said information associated to the angles above mentioned to a virtual vehicle (associated with the vehicle V) that moves in the virtual geographical area $A_V$ in the same way with which the vehicle V moves in the geographical area of interest A.

The virtual vehicle has the same position, the same rotation (i.e. the same pitch angle and he same roll angle) and the same heading as the vehicle V.

In this way, the virtual vehicle "follows" each movement of the vehicle and the viewing of the virtual scenario (in the specific case associated with the real scenario surrounding the vehicle) changes depending on the movement of the vehicle V.

In other words, the observation point of a person (on a vehicle V) observing a real scenario is the same observation point with which the virtual scenario is viewed.

The vehicle V is a real vehicle that moves within said geographical area of interest A and the real scenario contained in said geographical area of interest can comprise or be constituted of monuments, fountains, churches, buildings, squares, villas, etc.

The virtual vehicle is an element moving within a virtual geographical area $A_V$ created and modelled on the basis of the geographical area of interest A.

In the embodiment being disclosed, the virtual scenario is created and modelled on the basis of the real scenario contained in the geographical area of interest A (although, as said above such a virtual scenario can be any one 3D graphic content, also a 3D fantasy graphic content).

For example if the vehicle V gets on a sidewalk due to a hole the vehicle has a sussultatory movement, the viewing of the real scenario would change for a time interval and consequently the viewing of the virtual scenario associated with it would change.

With reference to the system above disclosed, it is preferable that the information associated with the pitch angle $\theta$, to the roll angle $\gamma$ and the heading $\phi$ are contained in a quaternion.

The quaternion is a four-dimensional complex number used to represent the orientation and rotation of three-dimensional objects and basically behaves like a four-component rotation matrix.

However, compared to a rotation matrix, the quaternion is numerically more stable and more efficient.

To this end it is preferable that said inertial measurement unit 2 comprises a gyroscope 21 for acquiring at each time instant t a respective triad of values associated with the angular velocities $\omega_x,\omega_y,\omega_z$ along the axes x,y,z,
in that the logic control unit 5 is connected to said gyroscope 21 and configured to:
- acquire at each time instant t from said inertial measurement unit 2 the values of each triad of angular velocities $\omega_x,\omega_y,\omega_z$ along the x,y,z axes,
- create a respective state vector $X_{k1}=[q_1,w_1]$, $X_{k2}=[q_2,w_2]$, $X_{k3}=[q_3,w_3]$, ... $X_{kn}=[q_n,w_n]$ at each time instant $t_1, t_2 \ldots t_n$, where $q_1=[q_{w1},q_{x1},q_{y1},q_{z1}]$, $q_2=[q_{w2},q_{x2},q_{y2},q_{z2}]$, $q_3=[q_{w3},q_{x3},q_{y3},q_{z3}]$ ... $q_n=[q_{wn},q_{xn},q_{yn},q_{zn}]$ are respective quaternions in respective time instants $t_1, t_2, t_3 \ldots t_n$, each of which is obtained from said pitch angle $\theta$, said roll angle $\gamma$ and from said heading $\phi$ at a respective time instant $t_1,t_2, t_3 \ldots t_n$, e $w_1=[w_{x1},w_{y1},w_{z1}]$, $w_2=[w_{x2},w_{y2},w_{z2}]$, $w_3=[w_{x3},w_{y3},w_{z3}]$ ... $w_n=[w_{xn},w_{yn},w_{zn}]$ are respective triads of angular velocities at respective time instants $t_1, t_2, t_3 \ldots t_n$.

It is furthermore preferable that each quaternion from quaternion $q_2$ at the time instant $t_2$ to quaternion $q_n$ at time instant $t_n$ is obtained by applying an extended Kalman filter to quaternion at the previous time instant:

$$q_2=q_1'=[q_{w1}',q_{x1}',q_{y1}',q_{z1}'],$$

$$q_3=q_2'$$

$$\ldots$$

$$q_n=q_{n-1}'$$

In particular, the pitch angle $\theta$, the roll angle $\gamma$ and the heading $\phi$ allow to calculate a quaternion e $q_1=[q_w,q_x,q_y,q_z]$.

Said quaternion $q_1$ together with the values of the angular velocities $\omega_x,\omega_y,\omega_z$ along x,y,z axes at a first time instant $t_1$ form a first state vector $X_{k1}$.

After obtaining the first state vector $X_{k1}$, the logic control unit 5 filters said first state vector $X_{k1}$ by means of an extended Kalman filter to obtain a matrix comprises a further quaternion that is a filtered quaternion $q_2'=q_1'=[q_{w1}', q_{x1}',q_{y1}',q_{z1}']$ from which it is possible to obtain information about orientation and rotation of the vehicle V with respect to the planes defined by the x,y,z axes (i.e. the xy plane, the xz plane, the yz plane).

Advantageously, the application of the extended Kalman filter serves to remove the noise of which the information about orientation and rotation of the vehicle V with respect to the x,y,z axes are affected.

For each time instant $t_2, t_3 \ldots t_n$ subsequent to the first time instant $t_1$, is created a respective state vector $X_{k2}, X_{k3}, \ldots X_{kn}$ comprising a respective quaternion $q_2, q_3, \ldots q_n$, in which each quaternion is a quaternion filtered by means of the extended Kalman filter, and a respective triad of angular velocities $w_2=[w_{2x}, w_{2y}, w_{2z}]$, $w_3=[w_{3x}, w_{3y}, w_{3z}] \ldots w_n=[w_{xn}, w_{yn}, w_{zn}]$.

In other words, each state vector $X_{k2}, X_{k3}, \ldots X_{kn}$ is filtered to obtain a respective matrix comprising a respective quaternion filtered $q_2, q_3, \ldots q_n$ that is used in the subsequent state vector, i.e. the state vector created at the subsequent time instant.

Hence, the quaternion $q_2$ present in the second state vector $X_{k2}$ is the quaternion that has been obtained by applying the extended Kalman filter to the first state vector $X_{k1}$.

The quaternion $q_3$ present in the third state vector $X_{k3}$ is the quaternion that has been obtained by applying the extended Kalman filter to the second state vector $X_{k2}$.

The quaternion $q_4$ present in the fourth state vector $X_{k4}$ is the quaternion that has been obtained by applying the extended Kalman filter to third state vector $X_{k3}$, and so on.

With reference to the system 1 above disclosed, in the embodiment being disclosed, said inertial measurement unit 2, said geolocation device 3, said storage means 4 and said logic control unit 5 are installed on the vehicle V.

However, said inertial measurement unit 2 and said geolocation device 3 can be installed on the vehicle V and said storage means 4 and said logic control unit 5 can be arranged outside of the vehicle V, without departing from the scope of the invention.

The present invention relates also to a vehicle V comprising the system above disclosed.

In other words, the system 1 above disclosed is installed ion the vehicle V.

The position of the vehicle V, the orientation and a possible rotation in a geographical area of interest A are data that are associated with a virtual vehicle that is associated with said vehicle V and moves in a virtual geographical area Av associated with said geographical area of interest.

In this way, said virtual vehicle "follows" the movements of said vehicle V and a user observes a dynamic virtual scenario changing over time depending on the movement of the vehicle V in the geographical area of interest with an observation point that is the same observation point with which the user would observe the rea scenario In the embodiments being disclosed, the vehicle V is provided with one or more windows W and at least one displaying device D for displaying a virtual scenario.

Said displaying device D is arranged inside said vehicle V so as to be facing a window W or at least a portion of one of said windows W.

Said displaying device D can be fixed or coupled with the roof or the floor of the vehicle V by means of connecting means of known type.

In the embodiment being disclosed, said displaying device D is coupled with the floor of the vehicle V by means of a connecting road.

Figure 6:
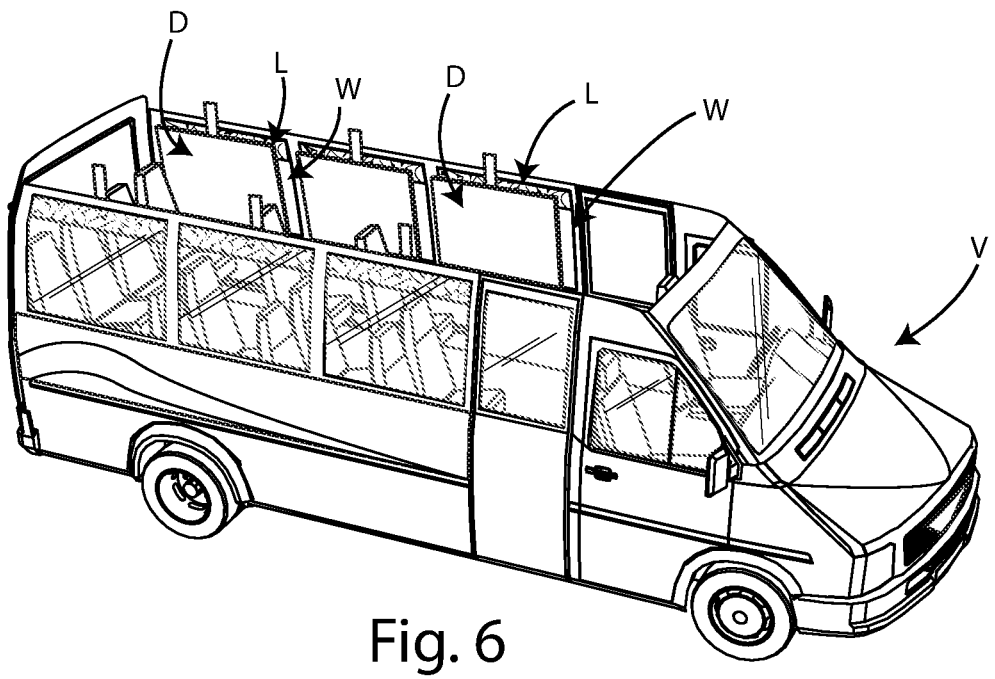
FIG. 6 is a schematic view of a vehicle on which the system according to the invention is installed, from which the roof has been removed, in which said vehicle is provided with a plurality of display devices for displaying a virtual content, each of which is arranged inside the vehicle in such a way as to be facing a respective window.

As shown in FIG. 6, in the example being disclosed, the vehicle V is provided with a plurality of windows W and a plurality of displaying devices D, each of which faces a respective window W.

Each displaying device has a first surface or front surface, arranged at a first distance from the window, and a second surface or rear surface, arranged at a second distance from the window, less than said first distance.

However, depending on the size of the windows V of the vehicle V and the size of the displaying device D, it is possible that more displaying devices D face a respective portion of a same window W, without departing from the scope of the aim invention.

In the embodiment being disclosed, said displaying device D comprises a display made of a transparent material, preferably a transparent OLED display.

In this case, through the transparent OLED display, the user is able to observe a real scenario outside the vehicle and, when the system is in use, a virtual scenario.

In the embodiment being disclosed, the virtual scenario is overlapped to the real scenario, since the virtual scenario is associated to the real scenario.

Furthermore, in the embodiment being disclosed, said vehicle V comprises filtering means L for filtering a percentage of light radiation with respect to the light radiation coming from the external environment and incident on one or more windows W, so as to avoid that a significant amount of light radiation enters the vehicle V through one or more windows W.

It is preferably that said filtering means L are configured to filter a percentage of light radiation between 80% and 100%.

In this way, only a modest percentage of light radiation can reach the displaying device D, so as not to cause a discomfort to the viewing of the virtual content by an observer.

When the percentage of light radiation filtered by the filtering means is equal to 100% the light radiation does not reach the displaying device.

In the embodiment being disclosed, said filtering means L comprise a blackout curtain for each window W.

In the embodiment being disclosed, said blackout curtain is in fireproof PVC material.

When the displaying device D is not in use, the blackout curtain is lifted with respect to the window, as shown in FIG. 7A.

The observer can observe the second statue S2 along the first path T1 through the window W of the vehicle V.

When the displaying device D is in use the blackout curtain is lowered with respect the window to allow the viewing of a virtual scenario on said displaying device D, as shown in FIG. 7B.

The observer can observe the second virtual statue S2v (that, as said, is the reproduction of the second statue S2 in its entirety) displayed on a displaying device D.

The blackout curtain can be operated by manually or motorized.

In the case of a manual drive, the lifting and lowering of said blackout curtain can be simple manual operations.

If the blackout curtain is motorized, a user can lift and lower such curtain by means of a switch.

However, although not shown in Figures, it is not necessary that the displaying device D is made of a transparent material nor the presence of filtering means L.

In fact, when the display device D is not a display made of a transparent material (for example the display device is a display provided with a non-transparent rear panel), the presence of filtering means L is not necessary, as a possible percentage of light radiation which affects the window and subsequently the rear surface of the display does not cause any discomfort to the viewing of the virtual scenario.

As already said, in the example being disclosed, said vehicle V is a minibus.

However, said vehicle V can be a car or a coach or a bus or a tram or a train or any vehicle provided with one or more windows, without departing from the scope of the invention.

The present invention relates also to a method for associating a virtual scenario to a real scenario during the moving of a vehicle V within a geographical area of interest A, through the system above disclosed.

Said method comprises the following steps:

A) acquiring at each time instant t the values of each triad of linear accelerations $A_X, A_Y, A_Z$, as well as the values of each vector $m=[m_x, m_y, m_z]$ associated with the terrestrial magnetic field strength, B) calculating a pitch angle $\theta$ and a roll angle $\gamma$ associated with said vehicle V on the basis of said values associated to the linear accelerations $A_X, A_Y, A_Z$, as well as a heading $\phi$, expressed in terms of angle, on the basis of horizontal components of said terrestrial magnetic field strength, C) acquiring at each time instant t the geographical coordinates $LAT_V, LONG_V$ associated with said vehicle V, D) calculating the Cartesian coordinates identifying the position of said vehicle V with respect to the Cartesian plane $x_A, y_A$ by means of the following formulas:

$$P_{Vx}^{x_A} = \frac{(LONG_V - LONG_{P2}) \times X_{DIF}}{LONG_{DIF}} + x_{P2}^{x_A}$$

$$P_{Vy}^{y_A} = \frac{(LAT_V - LAT_{P2}) \times Y_{DIF}}{LAT_{DIF}} + y_{P2}^{y_A}$$

E) applying said Cartesian coordinates $P_{Vx}^{x_A}, P_{Vy}^{y_A}$ and the information associated with said pitch angle $\theta$, said roll angle $\gamma$ and said heading $\phi$ to said virtual geographical area $A_V$, to determine how said vehicle V moves with respect to said virtual geographical area $A_V$, so that each movement of said vehicle V in said geographical area of interest A corresponds to a movement in said virtual geographical area $A_V$, and F) selecting a portion of said virtual scenario stored in said storage means 4, on the basis of said Cartesian coordinates $P_{Vx}^{x_A}, P_{Vy}^{y_A}$ and said information associated with said pitch angle $\theta$, said roll angle $\gamma$ and said heading $\phi$.

Said method comprises also the following step:

G) generating a frame associated with said selected portion by means of a 3D rendering engine.

Furthermore, the step A of the method can comprise the following sub-step:

A1) acquiring at each time instant t a respective triad of angular velocities $\omega_X, \omega_Y, \omega_Z$ along the x, y, y axes, and the step B of the method can comprise the following sub-step:

B1) creating a respective state vector $X_{k1}=[q_1, w_1]$, $X_{k2}=[q_2, w_2]$, $X_{k3}=[q_3, w_3]$, ... $X_{kn}=[q_n, W_n]$ in each time instant $t_1, t_2 ... t_n$, where
$q_1=[q_{w1}, q_{x1}, q_{y1}, q_{z1}]$, $q_2=[q_{w2}, q_{x2}, q_{y2}, q_{z2}]$, $q_3=[q_{w3}, q_{x3}, q_{y3}, q_{z3}]$ ... $q_n=[q_{wn}, q_{xn}, q_{yn}, q_{zn}]$ are respective quaternions in respective time instants $t_1, t_2, t_3 ... t_n$, each of which is obtained from said pitch angle $\theta$, from said roll angle $\gamma$ and from said heading $\phi$ in a respective time instant $t_1, t_2, t_3 ... t_n$, $w_1=[w_{x1}, w_{y1}, w_{z1}]$, $w_2=[w_{x2}, w_{y2}, w_{z2}]$, $w_3=[w_{x3}, w_{y3}, w_{z3}]$ ... $w_n=[w_{xn} w_{yn}, w_{zn}]$ are respective triads of angular velocities in respective time instants $t_1, t_2, t_3 ... t_n$.

In this case, the information associated with said pitch angle $\theta$, said roll angle $\gamma$ and said heading $\phi$ are contained in each quaternion $q_1, q_2 ... q_n$.

In particular, it is preferable that each quaternion from the quaternion $q_2$ at the time instant $t_2$ to the quaternion $q_n$ at the time instant $t_n$ is obtained by applying an extended Kalman filter to the quaternion at the previous time instant:

$q_2 = q_1' = [q_{w1}', q_{x1}', q_{y1}', q_{z1}']$, $q_3 = q_2'$

. . . .

$q_n = q_{n-1}'$

With reference to the pitch angle $\theta$, to the roll angle $\gamma$ and the heading $\phi$ above mentioned, said pitch angle $\theta$, said roll angle $\gamma$ and said heading $\phi$ can be calculated by means of the following formulas:

$$\theta = \arcsin\left(\frac{A_x}{g}\right)$$

where
$A_x$ is the value of linear acceleration along the x axis,
g is the acceleration of gravity, $$\gamma = \arctan\left(\frac{-A_Y}{A_Z}\right)$$

where
$A_Y, A_Z$ are the values of linear accelerations respectively along the y axis and the z axis, $$\phi = \arctan\left(\frac{m_z^l}{m_x^l}\right) + D_m$$

where
$m_x^l, m_z^l$, are the horizontal components of said terrestrial magnetic field strength respectively along the x axis and the z axis,
$D_m$ is the magnetic declination.

The horizontal component $m_x^l$ along the x axis and the horizontal component $m_z^l$ along the z axis of said terrestrial magnetic field strength are calculated by means of the following formula:

$$\begin{bmatrix} m_x^l \\ m_y^l \\ m_z^l \end{bmatrix} = \begin{bmatrix} \cos\theta & \sin\theta & 0 \\ -\cos\gamma\sin\theta & \cos\gamma\cos\theta & \sin\gamma \\ \sin\theta\sin\gamma & -\sin\gamma\cos\theta & \cos\gamma \end{bmatrix} \begin{bmatrix} m_x \\ m_y \\ m_z \end{bmatrix}$$

Furthermore, said method can comprise a step of verifying if the geographical coordinates $LAT_V, LONG_V$ of said vehicle V are contained in said geographical area of interest A and the step of calculating the Cartesian coordinates that identify the position of said vehicle V with respect to the Cartesian plane $x_A, y_A$ can only be performed if the geographical coordinates $LAT_V, LONG_V$ associated with said vehicle V are contained in the geographical area of interest A.

Furthermore, the present invention relates to a computer program comprising instructions which, when the program is executed by a computer, cause the computer to carry out the steps of said method The present invention relate also to a computer-readable storage medium comprising instructions which, when executed by a computer, cause the computer to carry out the steps of said method.

Advantages

Advantageously, by means of the system object of the invention it is possible to obtain information on the vehicle V which moves within a geographical area of interest A (such as the position, the rotation with respect to the axes of a reference system associated with the vehicle and the heading), and associate such information with a virtual vehicle moving in a virtual geographical area $A_V$ associated with said geographical area of interest A, so that the observation point with which the person on board the vehicle observes said virtual scenario is the same observation point with which the same person observes the real scenario.

A further advantage is given by the fact that said system offers the user a dynamic and immersive viewing, as the user can immerse himself in the viewing of a virtual scenario that changes according to the movement of the vehicle in the geographical area of interest.

The present invention has been described for illustrative, but not limitative purposes, according to its preferred embodiment, but it is to be understood that variations and/or modifications can be carried out by a skilled in the art, without departing from the scope thereof, as defined according to enclosed claims.

The invention claimed is:

1. A system configured to select a portion of a virtual scenario during movement of a vehicle within a geographical area of interest, wherein said virtual scenario comprises a 3D graphic content or a 3D graphic content in combination with an audio content, said system comprising:
at least one inertial measurement unit, to be installed on said vehicle, comprising:
an accelerometer to acquire at each of one or more time instants t a respective triad of values associated with linear accelerations $A_X$, $A_Y$, $A_Z$ along orthogonal x, y, z axes of a coordinate system, and
a magnetometer to measure at each time instant t values of a respective vector m=[$m_x$, $m_y$,$m_z$] associated with a terrestrial magnetic field strength along the x, y, z axes,
at least one geolocation device, to be installed on said vehicle, to obtain at each time instant t geographical coordinates $LAT_v$, $LONG_v$ in terms of latitude and longitude values associated with said vehicle,
storage in which the following data are stored:
said geographical area of interest, where each of one or more points in said geographical area of interest is associated with a value of latitude and a value of longitude,
a Cartesian plane $x_A,y_A$ associated with said geographical area of interest, each point of said geographical area of interest corresponding to a respective point on said Cartesian plane $x_A$, $y_A$,
a position of a first point P1 identified by first Cartesian coordinates $x_{P1}^{x_A}$, $y_{P1}^{y_A}$ with respect to said Cartesian plane $x_A,y_A$ and corresponding first values of latitude and longitude $LAT_{P1}$, $LONG_{P1}$ with respect to said geographical area of interest,
a position of a second point P2, different from said first point P1 identified by second Cartesian coordinates $x_{P2}^{x_A}$, $y_{P2}^{y_A}$ with respect to said Cartesian plane $x_A,y_A$ and corresponding second values of latitude and longitude $LAT_{P2}$, $LONG_{P2}$ with respect to said geographical area of interest,
a virtual geographical area associated with said geographical area of interest,
at least one virtual scenario, wherein said virtual scenario is a function of a plurality of parameters referred to said vehicle, said parameters comprising: a position of said vehicle in said geographical area of interest, a pitch angle θ, a roll angle γ and a heading φ,
a first difference value $LAT_{DIF}$ and a second difference value $LONG_{DIF}$ expressed respectively in terms of latitude and longitude, as well as a third difference value $X_{DIF}$ and a fourth difference value $Y_{DIF}$ expressed respectively in terms of Cartesian coordinates with respect to the Cartesian plane $x_A,y_A$:

$LAT_{DIF}=LAT_{P1}-LAT_{P2}$ $LONG_{DIF}=LONG_{P1}-LONG_{P2}$ $X_{DIF}=x_{P1}^{x_A}-x_{P2}^{x_A}$ $Y_{DIF}=y_{P1}^{y_A}-y_{P2}^{y_A}$ logic control unit being connected to said inertial measurement unit, to said geolocation device, as well as to said storage, and configured to:
acquire at each time instant t from said inertial measurement unit, the values of each triad of linear accelerations $A_X$, $A_Y$, $A_Z$, as well as the values of each vector m=[$m_x$, $m_y$, $m_z$] associated with the terrestrial magnetic field strength,
calculate the pitch angle θ and the roll angle γ associated with said vehicle on the basis of said values associated with the linear accelerations $A_X$, $A_Y$, $A_Z$, as well as the heading φ, expressed in terms of angle, on the basis of horizontal components of said vector values $m_x$, $m_y$, $m_z$, associated with the terrestrial magnetic field strength,
acquire at each time instant t from said geolocation device the geographical coordinates $LONG_v$, $LAT_v$ associated with said vehicle,
calculate Cartesian coordinates $P_{Vx}^{x_A}$,$P_{Vy}^{y_A}$ identifying the position of said vehicle with respect to the Cartesian plane $X_A$, $y_A$ by means of the following formulas:

$$P_{Vx}^{x_A} = \frac{(LONG_V - LONG_{P2}) \times X_{DIF}}{LONG_{DIF}} + x_{P2}^{x_A}$$

$$P_{Vy}^{y_A} = \frac{(LAT_V - LAT_{P2}) \times Y_{DIF}}{LAT_{DIF}} + y_{P2}^{y_A}$$

apply said Cartesian coordinates $P_{Vx}^{x_A}$,$P_{Vy}^{y_A}$ and the calculated values of said pitch angle θ, said roll angle γ and said heading φ to said virtual geographical area to determine how said vehicle moves with respect to said virtual geographical area, so that at each movement of said vehicle in said geographical area of interest corresponds to a movement in said virtual geographical area, and select a portion of said virtual scenario stored in said storage, on the basis of said Cartesian coordinates $P_{V_x}{}^{X_A}, P_{V_y}{}^{y_A}$ and the calculated values of said pitch angle θ, said roll angle γ and said heading φ.

2. The system according to claim 1, wherein said logic control unit is configured to generate a frame associated with said selected portion by means of a 3D rendering engine.

3. The system according to claim 1, wherein said pitch angle θ, said roll angle γ and said heading φ are calculated by means of the following formulas:

$$\theta = \arcsin\left(\frac{A_x}{g}\right)$$

where $A_x$ is the value of linear acceleration along the x axis,
g is the acceleration of gravity, $$\gamma = \arctan\left(\frac{-A_Y}{A_Z}\right)$$

where $A_Y$, $A_Z$ are the values of linear accelerations respectively along the y axis and the z axis, $$\phi = \arctan\left(\frac{m_z^l}{m_x^l}\right) + D_m$$

where $m_x^l$, $m_z^l$ are the horizontal components of said vector values $m_x$, $m_y$, $m_z$ associated with the terrestrial magnetic field strength respectively along the x axis and the z axis, $D_m$ is a magnetic declination.

4. The system according to claim 3, wherein the logic control unit is configured to obtain the horizontal component $m_x^l$ along the x axis and the horizontal component $m_z^l$ along the z axis of said terrestrial magnetic field strength by means of the following formula:

$$\begin{bmatrix} m_x^l \\ m_y^l \\ m_z^l \end{bmatrix} = \begin{bmatrix} \cos\theta & \sin\theta & 0 \\ -\cos\gamma\sin\theta & \cos\gamma\cos\theta & \sin\gamma \\ \sin\theta\sin\gamma & -\sin\gamma\cos\theta & \cos\gamma \end{bmatrix} \begin{bmatrix} m_x \\ m_y \\ m_z \end{bmatrix}.$$

5. The system according to claim 1, wherein said geographical area of interest has the shape of a rectangle or square, and wherein said first point P1 and said second point P2 are arranged at a respective vertex of said rectangle or of said square and said vertices are arranged along a diagonal of said rectangle or of said square.

6. The system according to claim 1, wherein said at least one inertial measurement unit comprises a gyroscope for acquiring at each time instant ta respective triad of values associated with angular velocities $\omega_x$, $\omega_y$, $\omega_z$ along the x, y, z axes, and wherein said logic control unit is configured to:

acquire at each time instant t from said inertial measurement unit the values of each triad of angular velocities $\omega_x$, $\omega_y$, $\omega_z$ along the x, y, z axes, create a respective state vector $X_{k1}=[q_1, w_1]$, $X_{k2}=[q_2, w_2]$, $X_{k3}=[q_3, w_3]$, ... $X_{kn}=[q_n, w_n]$ in each time instant $t_1, t_2, t_3, \ldots t_n$, where $q_1=[q_{w1}, q_{x1}, q_{y1}, q_{z1}]$, $q_2=[q_{w2}, q_{x2}, q_{y2}, q_{z2}]$, $q_3 [q_{w3}, q_{x3}, q_{y3}, q_{z3}], q_n \ldots q_n=[q_{wn}, q_{xn}, q_{yn}, q_{zn}]$ are respective quaternions in respective time instants $t_1, t_2, t_3 \ldots t_n$, each of which is obtained from said pitch angle θ, said roll angle γ and from said heading φ in a respective time instant $t_1, t_2, t_3 \ldots t_n$, $w_1=[w_{x1}, w_{y1}, w_{z1}]$, $w_2=[w_{x2}, w_{y2}, w_{z2}]$, $w_3=[w_{x3}, w_{y3}, w_{z3}] \ldots w_{xn}=[w_{xn}, w_{yn}, w_{zn}]$ are respective triads of angular velocities in respective time instants $t_1, t_2, t_3 \ldots t_n$, where the calculated values of said pitch angle θ, said roll angle γ and said heading φ are contained in each quaternion $q_1, q_2 \ldots q_n$.

7. The system according to claim 6, wherein each quaternion from the quaternion $q_2$ at the time instant $t_2$ to the quaternion $q_n$ at the time instant $t_n$ is obtained by applying an extended Kalman filter to the quaternion at the previous time instant:

$$q_2=q_1'=[q_{w1}'', q_{x1}'', q_{y1}'', q_{z1}''],$$

$$q_3=q_2''$$

. . . .

$$q_n=q_{n-1}''.$$

8. The system according to claim 1, wherein said logic control unit is configured to verify whether the geographical coordinates $LAT_V$, $LONG_V$ of said vehicle are contained in said geographical area of interest, and calculate the Cartesian coordinates $P_{V_x}{}^{X_A}, P_{V_y}{}^{y_A}$ with respect to the Cartesian plane $X_A, y_A$ only if the geographical coordinates $LAT_V$, $LONG_V$ associated with said vehicle are contained in the geographical area of interest.

9. The system according to claim 1, wherein said geolocation device is a GNSS receiver.

10. A vehicle comprising a system according to claim 1, wherein said vehicle comprises at least one displaying device for displaying said virtual scenario.

11. The vehicle according to claim 10, wherein said vehicle is provided with one or more windows and said at least one displaying device is arranged inside said vehicle so as to face at least one portion of one of said one or more windows.

12. The vehicle according to claim 11, wherein said at least one displaying device comprises a display made of a transparent material, said-vehicle comprises a filtering device to filter a percentage of light radiation with respect to a light radiation coming from an external environment and incident on said one or more windows, arranged between said one or more windows and said at least one displaying device.

13. The vehicle according to claim 12, wherein said percentage of light radiation is between 80% and 100%.

14. The vehicle according to claim 12, wherein said display made of a transparent material is a transparent OLED display.

15. The vehicle according to claim 12, wherein said filtering device comprises a respective blackout curtain for each window.

16. A method for selecting a portion of a virtual scenario stored in a storage during movement of a vehicle within a geographical area of interest, using the system according to claim 1, said method comprising:

acquiring at each of one or more time instants t values of a triad of linear accelerations $A_X$, $A_Y$, $A_Z$, as well as values of a vector m=[$m_x$, $m_y$, $m_z$] associated with a terrestrial magnetic field strength, calculating a pitch angle θ and a roll angle γ associated with said vehicle on the basis of said values associated with the linear accelerations $A_X$, $A_Y$, $A_Z$, as well as a heading φ, expressed in terms of angle, on the basis of horizontal components of said vector values $m_x$, $m_y$, $m_z$ associated with the terrestrial magnetic field strength, acquiring at each time instant t geographical coordinates LATv, LONGv associated with said vehicle, calculating Cartesian coordinates $P_{Vx}^{x_A}, P_{Vy}^{y_A}$ identifying a position of said vehicle with respect to a Cartesian plane $x_A$, $y_A$ by means of the following formulas:

$$P_{Vx}^{x_A} = \frac{(LONG_V - LONG_{P2}) \times X_{DIF}}{LONG_{DIF}} + x_{P2}^{x_A}$$

$$P_{Vy}^{y_A} = \frac{(LAT_V - LAT_{P2}) \times Y_{DIF}}{LAT_{DIF}} + y_{P2}^{y_A}$$

where $LAT_{DIF} = LAT_{P1} - LAT_{P2}$ $LONG_{DIF} = LONG_{P1} - LONG_{P2}$ $X_{DIF} = x_{P1}^{x_A} = x_{P2}^{x_A}$ $Y_{DIF} = y_{P1}^{y_A} = y_{P2}^{y_A}$ $x_{P1}^{x_A}, y_{P1}^{y_A}$ are first Cartesian coordinates identifying a position of a first point P1 in the Cartesian plane $x_A$, $y_A$, $LAT_{P1}$, $LONG_{P1}$ are first values of latitude and longitude corresponding to the first Cartesian coordinates $x_{P1}^{x_A}$, $y_{P1}^{y_A}$ of the first point P1, $x_{P2}^{x_A}, y_{P2}^{y_A}$ are second Cartesian coordinates identifying a position of a second point P2 in the Cartesian plane $x_A$, $y_A$, the second point P2 being different than the first point P1, $LAT_{P2}$, $LONG_{P2}$ are second values of latitude and longitude corresponding to the second Cartesian coordinates $x_{P2}^{x_A}, y_{P2}^{y_A}$ of the second point P2, $LAT_{DIF}$, $LONG_{DIF}$ are first and second difference values, respectively, expressed in terms of latitude and longitude, $X_{DIF}$, $Y_{DIF}$ are third and fourth difference values, respectively, expressed in terms of Cartesian coordinates with respect to the Cartesian plane $x_A$, $y_A$, applying said Cartesian coordinates $p_{vx}^{x_A}$, $p_{vy}^{y_A}$ and the calculated values of said pitch angle θ, said roll angle γ and said heading φ to said virtual geographical area, to determine how said vehicle moves with respect to said virtual geographical area, so that each movement of said vehicle in said geographical area of interest corresponds to a movement in said virtual geographical area, selecting a portion of said virtual scenario stored in said storage, on the basis of said Cartesian coordinates $p_{vx}^{x_A}$, $p_{vy}^{y_A}$ and the calculated values of said pitch angle θ, said roll angle γ and said heading φ.

17. The method according to claim 16, wherein the method further comprises:

generating a frame associated with said selected portion by means of a 3D rendering engine.

18. A non-transitory computer-readable storage medium comprising instructions which, when executed by a computer cause the computer to carry out the steps of the method according to claim 16.

* * * * *